United States Patent
Woodland et al.

(10) Patent No.: US 7,459,872 B2
(45) Date of Patent: Dec. 2, 2008

(54) HIGH SPEED MOTOR CONTROL

(75) Inventors: Lane L. Woodland, Excelsior, MN (US); Stephen M. Stocker, Andover, MN (US); David J. Badzinski, Minneapolis, MN (US); Jeffrey W. Shoemaker, Andover, MN (US); Keith A. Walters, Minneapolis, MN (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 152 days.

(21) Appl. No.: 11/702,419

(22) Filed: Feb. 5, 2007

(65) Prior Publication Data

US 2007/0296368 A1 Dec. 27, 2007

Related U.S. Application Data

(60) Provisional application No. 60/764,867, filed on Feb. 3, 2006.

(51) Int. Cl.
*G05B 19/31* (2006.01)
(52) U.S. Cl. ...................................... 318/605; 318/600
(58) Field of Classification Search ................. 318/600, 318/605, 727, 809
See application file for complete search history.

(56) References Cited

U.S. PATENT DOCUMENTS

| | | | |
|---|---|---|---|
| 5,134,397 A | 7/1992 | Eyerly et al. | |
| 5,162,798 A | 11/1992 | Yundt | |
| 5,585,709 A * | 12/1996 | Jansen et al. | 318/807 |
| 6,008,617 A | 12/1999 | Kaneko et al. | |
| 6,212,540 B1 * | 4/2001 | Murakami et al. | 708/819 |
| 6,239,571 B1 | 5/2001 | Shimahara | |
| 6,255,794 B1 | 7/2001 | Staebler | |
| 6,389,373 B1 | 5/2002 | Ohya | |
| 6,456,946 B1 * | 9/2002 | O'Gorman | 702/58 |
| 6,643,606 B2 | 11/2003 | Kim | |
| 6,754,610 B2 | 6/2004 | Dudler et al. | |
| 2004/0169488 A1 | 9/2004 | Maeda et al. | |

* cited by examiner

*Primary Examiner*—Rina I Duda
(74) *Attorney, Agent, or Firm*—Patterson, Thuente, Skaar & Christensen, P.A.

(57) ABSTRACT

The present invention relates to an apparatus and method for generating digital electrical signals which are representative of the angular position and rotational velocity of a rotatable shaft or similar movable mechanical component in a servo-mechanism. In particular, the present invention utilizes over-sampling techniques to create an accurate, flexible and responsive method for determining shaft position on a high speed motor. The present invention also includes methods for overcoming deadtime losses and velocity lag.

5 Claims, 13 Drawing Sheets

OPTION 1

OPTION 2

HIGH SPEED MOTOR CONTROL

RELATED APPLICATION

The present application claims the benefit of U.S. Provisional Application No. 60/764,867 filed Feb. 3, 2006, which is incorporated herein in its entirety by reference.

GOVERNMENT INTEREST

The invention was made by an agency of the U.S. Government or under a contract with an agency of the U.S. Government. The name of the U.S. Government agency is the U.S. Army and the Government contract number is DAAE 30-92-C-1112.

FIELD OF THE INVENTION

The present invention relates to control of servomotors, and in particular, to control of high speed servomotors that require mechanical sensors for accurate speed and position control.

BACKGROUND OF THE INVENTION

This invention relates to an apparatus and method for generating digital electrical signals which are representative of the angular position and rotational velocity of a rotatable shaft or similar movable mechanical component in an electromechanical servomechanism. Generally speaking, a servomechanism is a control system which controls an output physical quantity in response to an input command function. Frequently, the servomechanism is embodied as an electromechanical control system, wherein a mechanical output component is moved in accordance with an electrical input signal. Usually, the servomechanism includes a closed feedback loop, wherein a signal which is representative of the current status of the output physical quantity is compared with the current input command function. If there is a difference between the two, an error signal is generated which tends to urge the output physical quantity into compliance with the input command function.

In a typical electromechanical servomechanism, the output mechanical component may be a shaft which is rotated about an axis in accordance with a predetermined electrical input position signal. The servomechanism can function to rotate the shaft at a certain rotational velocity, to move the shaft to a certain rotational position, or to apply a certain torque or tension to a load in response to the electrical input signal. For example, most electric motors contain a rotor shaft which is driven to rotate about an axis relative to a stationary stator. Many conventional electric motors are controlled so as to rotate the rotor shaft at a certain rotational velocity relative to the stator in response to an electrical input signal.

In such servomechanisms, it is often desirable or necessary to know what the precise status of the output physical quantity is at any given point in time. As mentioned above, the servomechanism usually includes a closed feedback loop, wherein a signal representative of the current status of the output physical quantity is compared with the current input command function. In the electric motor example mentioned above, it is often necessary or desirable to know what the precise rotational velocity or position of the rotor shaft is relative to the stator. The rotational velocity or position signal can be used in several manners to improve the operation of the electric motor. For instance, the rotational position signal can be used to increase the accuracy of the rotational velocity or angular position of the rotor shaft relative to the stator. Also, the rotational position signal can be used to control the timing of the energizations and deenergizations of the windings of the electric motor in order to increase efficiency and reduce undesirable torque ripple.

The rotational position signal of the rotor shaft in an electric motor is usually expressed as an electrical signal, either analog or digital in nature, which is representative of the angular position of the rotor shaft relative to a predetermined starting or reference position. Thus, the rotational position signal can be expressed as an analog or digital signal which is representative of a number between 0° and 360°, wherein 0° represents the predetermined starting position or reference position of the rotor shaft relative to the stator. A number of devices are known in the art for generating electrical signals which are representative of the angular position of the rotor shaft relative to a predetermined starting or reference position.

A resolver is one well known device for generating electrical signals which are representative of the relative angular position of a rotatable shaft. A resolver input is typically supplied a sinusoidal signal (i.e., the "excitation signal") that drives the two resolver outputs. These outputs oscillate at the same frequency as the input but their amplitudes vary with shaft position and their phases are offset 90° with respect to each other (referred to as the sine and cosine signals). Essentially, the input is a carrier signal and the position is amplitude-modulated on the outputs. Generally speaking, a resolver is an electromechanical transducer which generates one or more output signals which vary in magnitude with the rotational position of the rotor shaft. Typically, the resolver generates two analog electrical output signals, one which is representative of the sine of the relative angle of the rotor shaft, and the other which is representative of the cosine of the relative angle of the rotor shaft. A number of different resolver structures are known in the art for performing this general function. The analog output signals may be used to control the operation of the servomechanism. Alternatively, it is known to convert the analog electrical output signals to respective digital electrical signals for subsequent use by a digital computing device, such as a microprocessor, in controlling the operation of the servomechanism.

To save size and weight in a servo application, high-speed motors can be utilized because they can produce the same amount of power as their larger and much slower counterparts. Motor control at high speeds, greater then 10,000 RPM, presents a number of challenges that must be overcome if high-speed motors are to be used in servo applications. For example, conventional hardware based resolver-to-digital conversion (RDC) integrated circuits have limitations in terms of resolution as a function of tracking rate. This is due to clock rate of the integrated circuit (IC) which is fixed. As one requires a motor to rotate at higher speeds due to application requirements, one must trade off resolution. If the position signal is of lower resolution, then the signal will have more harmonic content. To obtain velocity, it is simply the derivative of position. This results in a velocity feedback signal with even more harmonic content. This can have adverse affects on servo performance. Another limitation is that the accuracy has a hard limit again due to the implementation in hardware. Finally, the bandwidth of the device is fixed by the tracking rate. If the user desires to tune the bandwidth to obtain a faster response since the motor is running at high-speed, that is not possible with current hardware IC's. Furthermore, the phase lag in velocity changes as a function of speed. This is because often at higher speeds the gain of the system changes and with that the phase of any filtering and hardware devices also changes. At higher speeds, the phase lag in the velocity feedback becomes worse to a point that it affects the higher-level control loops and thus imposes limitations on servo performance.

While generally effective for many applications, known resolvers can generate errors in the analog electrical output signals which can reduce the accuracy of the resultant rotor shaft position signal. Currently, hardware-based components called resolver-to-digital converters (RDC) are employed to process resolver signals and to produce a digital representation of the shaft position. Most of the processing is performed with hard-wired analog circuitry and is incapable of tracking motion at high speeds and accelerations. A new way of processing resolver signals is required for accurate, high-speed, position and velocity control. Additionally, high speed servomotors have a winding inductance lower than standard servomotors. Pulse width modulated power applied to these windings at typical frequencies produce an unacceptable level of current ripple. Thus, it would be desirable to provide an apparatus and method which is effective for correcting time-varying errors which are generated in known resolvers so as to improve the overall accuracy of the position measurement and to permit the use of simpler and lower-cost resolver structures.

SUMMARY OF THE INVENTION

This invention relates to an apparatus and method for generating digital electrical signals which are representative of the angular position and rotational velocity of a rotatable shaft or similar movable mechanical component in a servomechanism. A novel solution to the problem was developed utilizing two spare channels from an analog-to-digital converter (ADC) and software-based signal filtering and processing, creating an accurate, flexible and responsive technique for determining shaft position on a high-speed motor. This software-based resolver-digital conversion technique demonstrated several performance advantages over the more traditional hardware-based RDC.

The present invention utilizes the sine and cosine outputs from the resolver which are simultaneously oversampled and converted to digital signals using an analog-to-digital converter. As far as terminology is concerned, oversampling refers to sampling a signal of interest by integer multiples above and beyond what is required to satisfy the Nyquist theorem. The digital signals are then processed by a (software) digital filter and demodulated. The demodulated signals are then decimated and normalized, and an arctangent is performed to determine the rotor angle. Finally, the rotor angle is fed to a proportional-integral (PI) loop with two integrators and an infinite impulse response (IIR) filter. The first integrator smoothes the rotor angle signal and also incorporates a velocity feed-forward correction term. The filtered position term is then differentiated by the IIR filter to produce an interpolated velocity signal. The second integrator integrates this velocity signal to produce an interpolated position and also incorporates velocity lag correction.

More specifically, the first step is oversampling the resolver outputs. This technique utilizes any two ADC inputs capable of simultaneously sampling the sine and cosine outputs of the resolver at least 8× per cycle. These two inputs can be either on the same ADC chip or on separate chips and are user configurable. The oversampling can enhance the resolution of the computed position by lessening the impact of a single bad sample. Each doubling of the sampling rate above 8× can improve the resolution by approximately 0.3-0.5 bits. Also, this can reduce the delay of any filtering by allowing the bandwidth to be increased.

Next, a band pass filter is employed to improve the signal-to-noise ratio of the oversampled sine and cosine signals. Basing the filtering in software allows both adaptive and multiple filtering techniques to be employed that can improve both bandwidth and accuracy. The decimator demodulates the oversampled, filtered, sine and cosine signals down to the baseband. A decimation of K is employed so that both sine and cosine are rectified prior to decimation or the output of the decimator rectified. This will double the number of data points provided to the arctangent unit and increase position resolution by approximately 0.5 bits.

The arctangent is then used to calculate rotational position, theta, from the demodulated sine and cosine signals that come from the decimator. The position and speed interpolator is essentially a double integrating Proportional-Integral (PI) control loop that performs the following functions: (1) improves the accuracy and resolution of the shaft position. By adjusting the bandwidth of this loop, resolution can be traded off similar to a hardware-based RDC. As a rule of thumb, resolution can be improved by 0.5 bits every time the bandwidth is halved. (2) Calculate angular velocity. This performs the same function as the derived rate algorithm. (3) Compensate for the group delay due to the software-based finite impulse response (FIR) filter. A FIR filter by definition has linear phase which means the group delay is constant and quantifiable; this can theoretically be compensated for. This is accomplished by setting the feedback delay of the PI loop equal to the group delay of the filter. The resulting output from the interpolator is an enhanced resolution position signal that has the velocity lag due to the signal filter removed. Due to the K decimation, the PI loop runs at double the rate that it would normally run with 2*K decimation.

Oversampling combined with FIR filtering followed by decimation results in improved resolution. The amount of oversampling that occurs is determined by a factor K. This results in additional samples in the signal that leads to improved signal information. The FIR bandpass filters then removes unwanted low and high frequency components in the signal frequency spectrum.

The present invention further includes a method for overcoming velocity lag. Even after re-tuning the position interpolator control loop such that the position error is driven to zero, there is still a velocity lag between the input and the output. This is because the algorithm is designed only to take out lag due to the FIR filter. Since the position error is being driven to zero, it is in fact accomplishing this task. However, there is still roughly 60-70 microseconds of lag between the input shaft position and the theta output of the model at 4320 RPM. There are still delays that remain due to hardware components in the system that contribute to additional lag. The analog-to-digital converter for example, contributes 20.26 microseconds of delay. In addition, there is lag due to the anti-aliasing filter.

The effects just described are measurable and can be compensated for. The first effect is the large overshoots that persist for a long time before dying out. The overshoots are the result of the large integrator gains needed in the position interpolator to take out the lag due to the FIR filter. The use of a velocity feed-forward can often mitigate this problem if used carefully. By "priming the pump" with some velocity up front, the faster response results in smaller overshoots and faster settling behavior.

The second effect is the residual velocity lag. The residual velocity lag due to system components can be canceled out by a velocity correction offset. Since the error has been found to be linearly increasing and decreasing, it is possible to cancel this error out. The gains are set depending on the slope of the error.

Furthermore, there are essential numerical effects that have been taken into account. In this implementation, the software is designed to run on a floating-point processor. It was found that using single-precision floating-point implementation in software was numerically unstable after the motor shaft would rotate for long periods of time. This was due to the integrators winding up with error due to the loss of precision after the number of motor turns gets larger. The solution was to implement an algorithm in software using double-precision floats. This forced the integrator to be minimized to a point where it is no longer an issue.

Another problem exacerbated by high speed motor operation involves delays due to deadtime during switching of the inverter. Inverters are power supplies that convert a fixed (DC) power source to a variable (AC) one through the use of high-speed electronic switches. FIG. 11 illustrates a standard topology for a three-phase inverter. Each of the three vertical sections containing an upper and lower switch is referred to as a "leg". Normally, when one switch opens the other switch in the same leg closes. Since the transition between open and closed states takes a finite period of time, a delay is inserted between the opening of one switch and the closing of the other. This delay, called deadtime, prevents both the upper and lower switches from being on at the same time and acting as a short circuit across the DC power source.

A novel method of compensating for this distortion is to monitor the on/off times of the switches in real time. This is accomplished by placing current monitors next to each switch. The current monitors could be either analog based (representing both the magnitude and direction of current flow) or digital based (representing the direction of current). The time between a commanded switch state and when the switch state was actually achieved would then be used as the deadtime. The advantage is that no margins of safety that negatively impact performance would have to be factored in. This information may also be used to determine whether a switch was in danger of imminent failure (if a correlation was found between increasing/decreasing deadtime and switch life).

DETAILED DESCRIPTION OF THE DRAWINGS

The present invention provides a novel way of processing resolver signals for accurate, high-speed position and velocity motor control. An alternative to hardware based resolver-to-digital converters, which have inherent limitations, is to perform the conversion in software. The method of obtaining and digitizing the angular position of a resolver is known as resolver-to-digital conversion. Software based resolver-to-digital converters can reduce cost and space claim by removing the RDC IC packages and using analog-to-digital conversion IC's to digitize the sine and cosine signals from the resolver. An FPGA and/or DSP are used to further process the data to determine the precise position. Furthermore, since the algorithm is implemented in software, the performance is comparable to that of the hardware-based solution. Furthermore, depending on the algorithm, the software RDC may outperform the hardware alternative in one or more of established performance metrics.

The present invention utilizes the sine and cosine outputs from the resolver which are simultaneously sampled and converted to digital signals using an analog-to-digital converter. The digital signals are then processed by a (software) digital filter and demodulated. The demodulated signals are then normalized and an arctangent is performed to determine the rotor angle. Finally, the rotor angle is fed to a PI loop with two integrators and an IIR filter. The first integrator smoothes the rotor angle signal and also incorporates a velocity feed-forward correction term. The filtered position term is then differentiated by the IIR filter to produce an interpolated velocity signal. The second integrator integrates this velocity signal to produce an interpolated position and also incorporates velocity lag correction.

Figure 1:
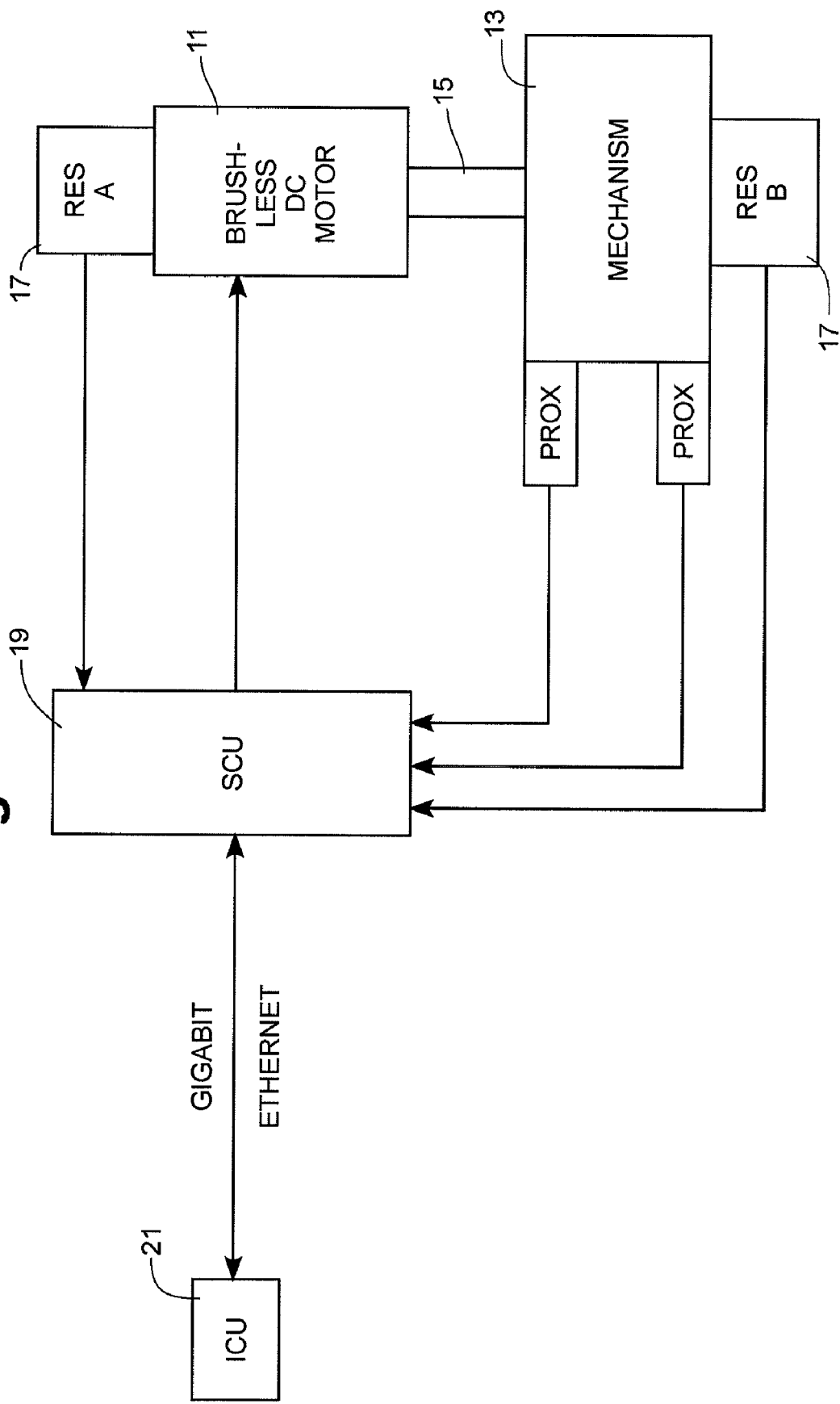
FIG. 1 is a top level block diagram of the servocontrol system.

FIG. 1 is a top level block diagram of the servocontrol system. The servocontrol unit (SCU) 19 includes one or more processors to perform, among other tasks, the software resolver-to-digital conversion, apply the torque commands to the torque loop and convert the command into three phases for return to the motor 11. Resolver 17 is mounted to the motor 11 and is operably connected to the SCU 19 for transmission of resolver positioning. A resolver 17 may also be mounted onto the mechanism 13 or load by way of shaft 15. The resolver 17 is also operably connected to the SCU 19. SCU 19 is operably connected to the interface conditioning unit (ICU) 21 for command and control.

Figure 2:
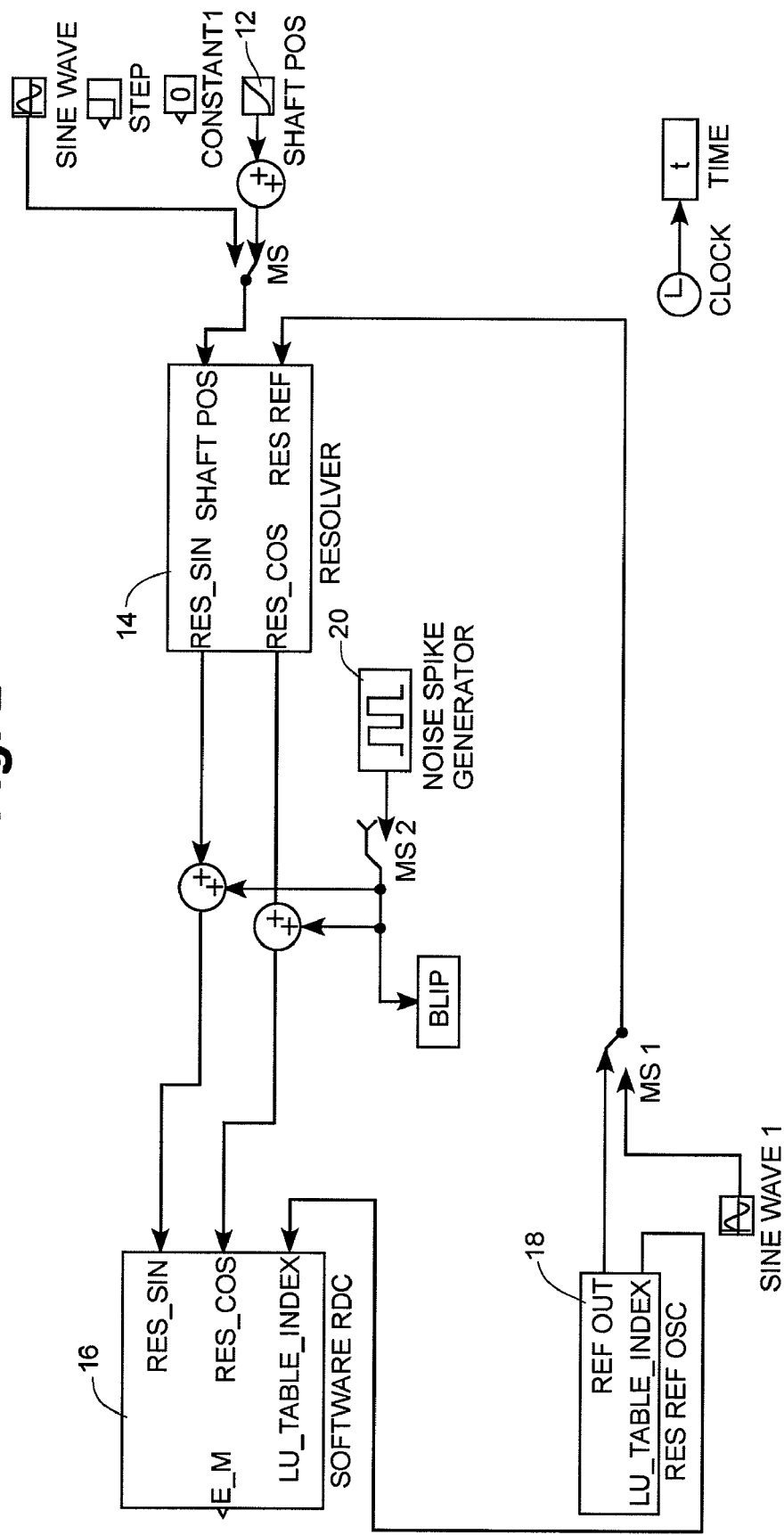
FIG. 2 is a top level block diagram of the software based resolver-to-digital (R/D) converter.

FIG. 2 is a top level block diagram of the software resolver-to-digital converter. In order to properly control a motor, the position of the rotor shaft must be known. Shaft position can be determined with the use of resolvers. A resolver is an absolute mechanical position sensor that is basically a rotating transformer. The resolver is mounted to a motor shaft to obtain the motor's absolute angular position. As illustrated in FIG. 2, the motor shaft position 12 is converted into sine and cosine resolver signals at resolver block 14 and then a software RDC algorithm 16 is used to convert to position and angular speed. A resolver reference signal 18 is also sent to the resolver block 14. The resolver cosine and resolver sine signals are then overlaid by a noise spike generator 20 which is used during simulations for noise robustness analysis.

Figure 3:
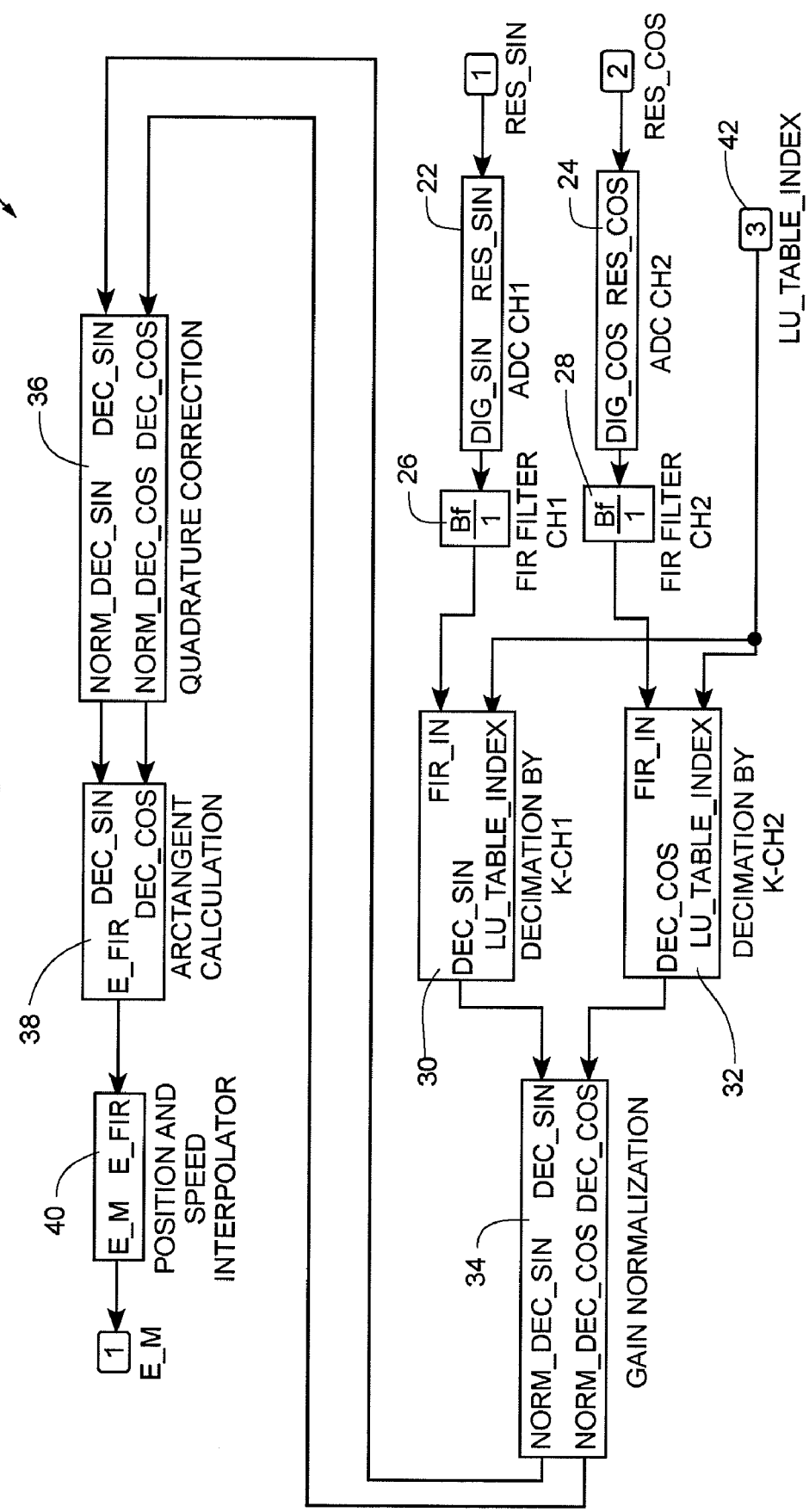
FIG. 3 is a system-level block diagram of the software based R/D converter.

FIG. 3 is a system level block diagram of the software resolver-to-digital converter 16. This is an illustration of the internal details of the soft RDC block 16. It includes: the analog-to-digital converters for sine channel 22 and cosine channel 24, corresponding FIR filters 26 and 28 for the respective sine and cosine channels 22 and 24, channel 1 decimation block 30 and channel 2 decimation block 32 (channel 1 applies to the resolver sine signal and channel 2 applies to the resolver cosine channel), a gain normalization block 34, a quadrature correction block 36, an arctangent block 38 for first-order calculation of theta, and a position and speed interpolator control loop 40 for refined resolution calculation of theta. Lookup table 42 provides an input for decimation channel 1 block 30 and decimation channel 2 block 32 calculations. In a first embodiment, the analog-to-digital converter 22, 24 is a 14-bit device with −10 to +10 volt rails. The filtering with decimation combined with interpolation leads to enhanced resolution. The resolution is also affected by the conversion bandwidth as determined by the bandwidth of the control loop.

Figure 4:
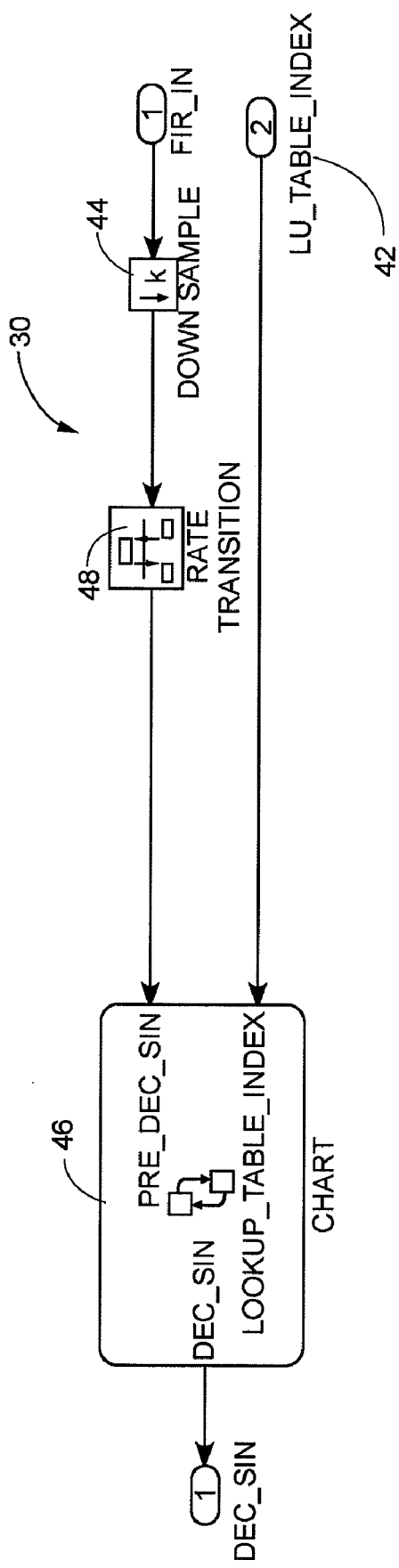
FIG. 4 is a block diagram of the decimation section of the software-based R/D converter.

FIG. 4 is a block diagram of the decimation channel 1 block 30 of the software resolver-to-digital converter 16. The decimation channel 1 block 30 demodulates the oversampled and filtered sine and cosine signals down to the baseband. Inside the Decimation by K block 44, the signal processing takes as inputs the output of the FIR filter. Rate transition is then applied in block 48 and the output is applied to the index of the lookup table 42 for the resolver reference generator that would normally be implemented in the FPGA. Chart 46 allows the index to the lookup table 42 to be synchronized with the time that the decimator is sampling the peaks (2*Kth sample) of the output signal of the FIR filter. This is used as a reference so that the 2*K+1th sample is inverted. In this way the decimator is effectively extracting every kth sample. Because the algorithm is decimating by K, this allows for a faster-running control loop which translates into less time delay in that part of the system. This reduces overall time delay and actually improves the lag between the input and output. Thus, accuracy is improved. In the first embodiment, decimating by K enhances resolution and accuracy and allows the bandwidth to be extended out to 2500 Hz. This is more than twice as much bandwidth as a conventional hardware resolver-to-digital converter offers.

Figure 5:
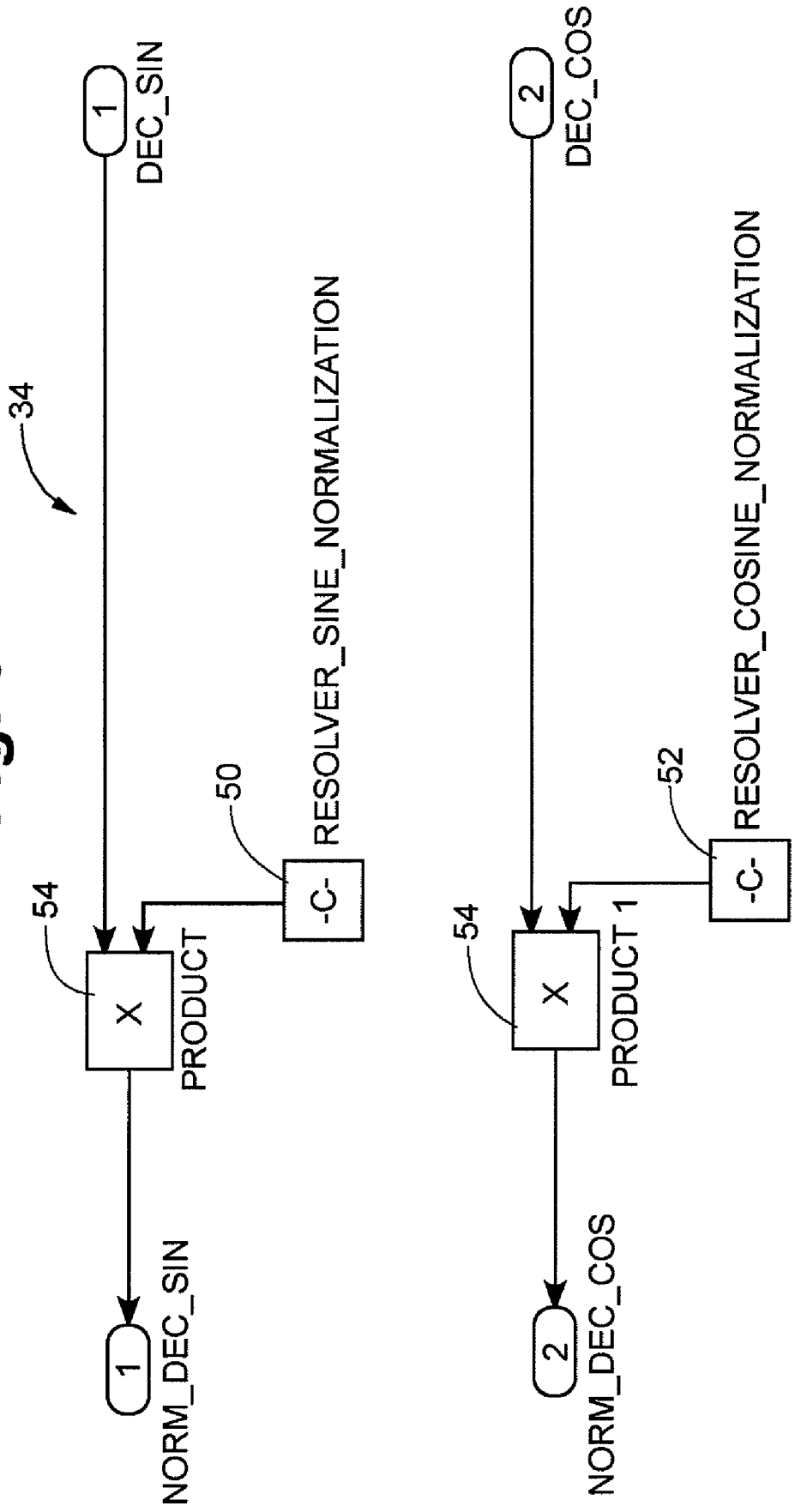
FIG. 5 is a block diagram of the converter gain normalization section of the software-based R/D converter.

FIG. 5 is a block diagram of the converter gain normalization section 34 of the software resolver-to-digital converter 16. Normalization may be required to correct for error due to imperfect cancellation of the even harmonics in the resolver 14 or from an amplitude imbalance between the two signals. The decimated sine and cosine signals are normalized by superimposing a normalized sinusoidal signal 50 or cosine signal 52 in an input step to normalization block 54 to create a normalized product.

Figure 6:
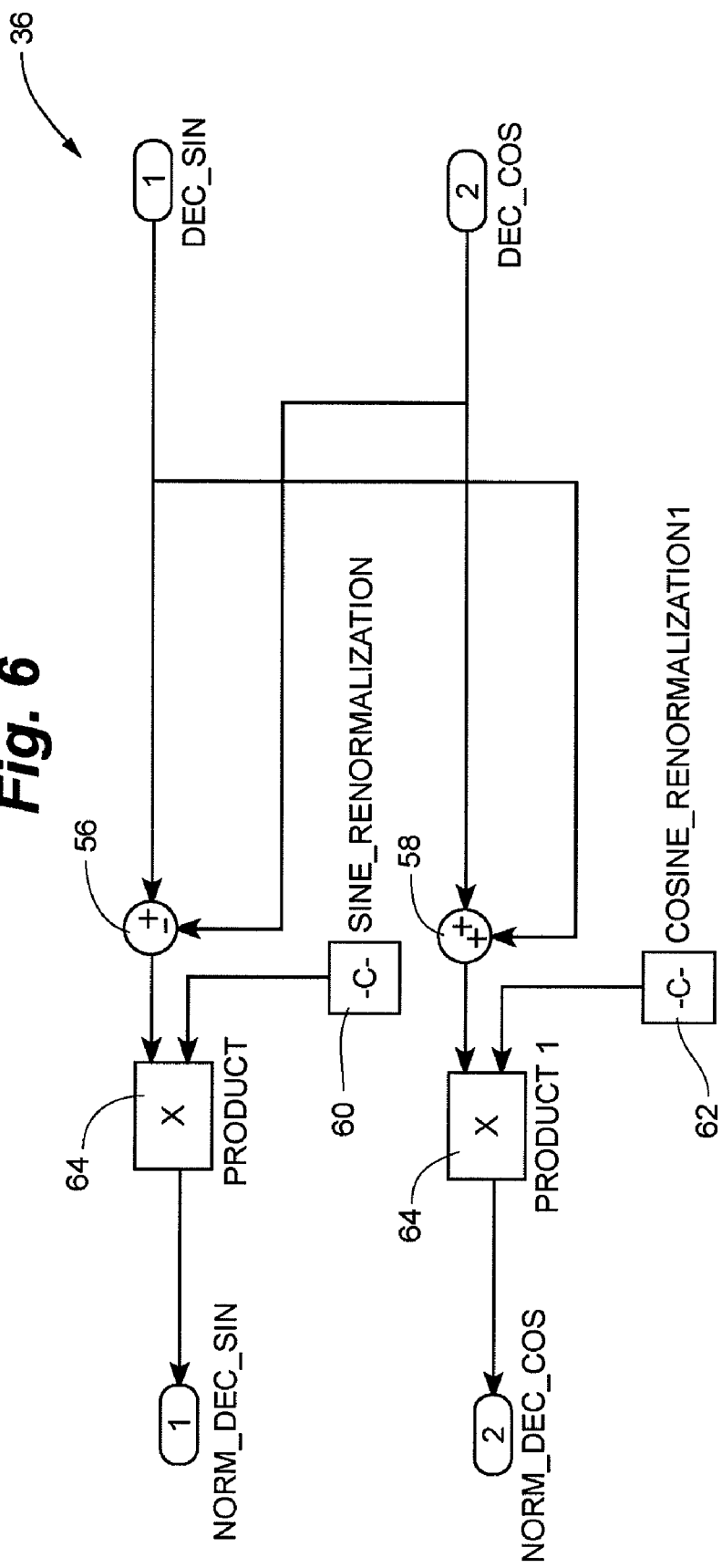
FIG. 6 is a block diagram of the converter quadrature normalization section of the software-based R/D converter.

FIG. 6 is a block diagram of the converter quadrature normalization section 36 of the software resolver to digital converter 16. This step is used to correct errors due to imperfect quadrature as when the sine and cosine signals are not precisely 90° out of phase. Such imbalances may be due to imperfect machining or assembly of the resolver 14. Quadrature correction 36 is performed by adding and subtracting the two demodulated signals 56 and 58 from one another. The corrected decimated sine and cosine signals are renormalized by superimposing a renormalized sinusoidal signal 60 or renormalized cosine signal 62 in an input step to renormalization block 64 to create a normalized product.

Figure 7:
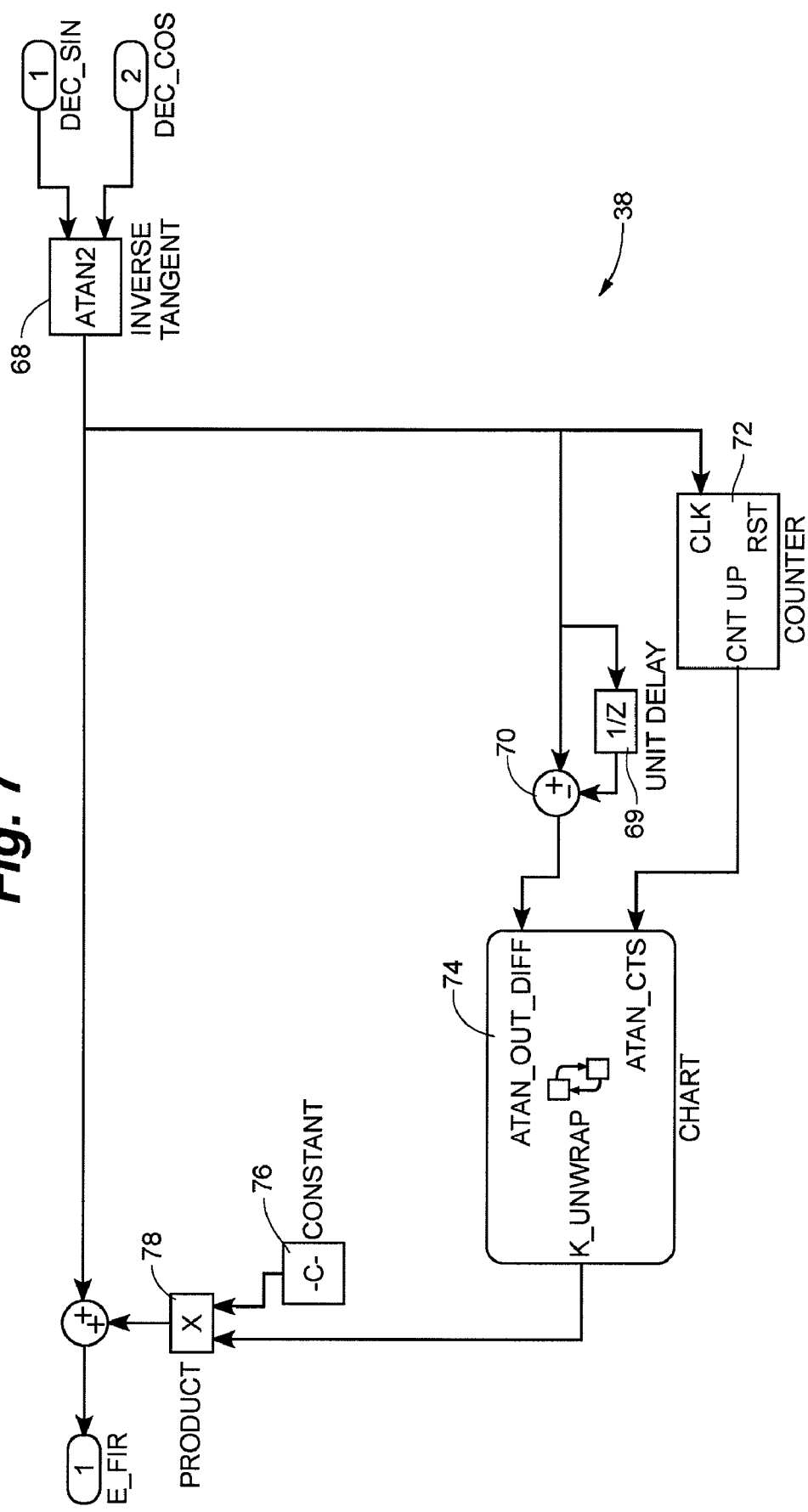
FIG. 7 is a block diagram of the converter arctangent calculation section of the software-based R/D converter.

FIG. 7 is a block diagram of the converter arctangent calculation section 38 of the software resolver-to-digital converter 16. The angle is derived by taking the arctangent of the quotient of the FIR filtered sine and cosine signals as shown in block 68 by the following equation:

$$\varepsilon_{FIR}(n) = \begin{cases} \arctan\left(\dfrac{u_{1,FIR}(n)}{u_{2,FIR}(n)}\right), & u_{2,FIR}(n) \geq 0 \\ \pi + \arctan\left(\dfrac{u_{2,FIR}(n)}{u_{1,FIR}(n)}\right), & u_{2,FIR}(n) < 0 \end{cases}$$

The arctangent 68 is then summed in block 70 with arctangent 69 delayed by 1/z. The arctangent 68 is also sent through counter 72 before chart block 74 where arctan difference is added. The position unwrapped signal is combined with constant 76, set at 2π, in product block 78.

Figure 8:
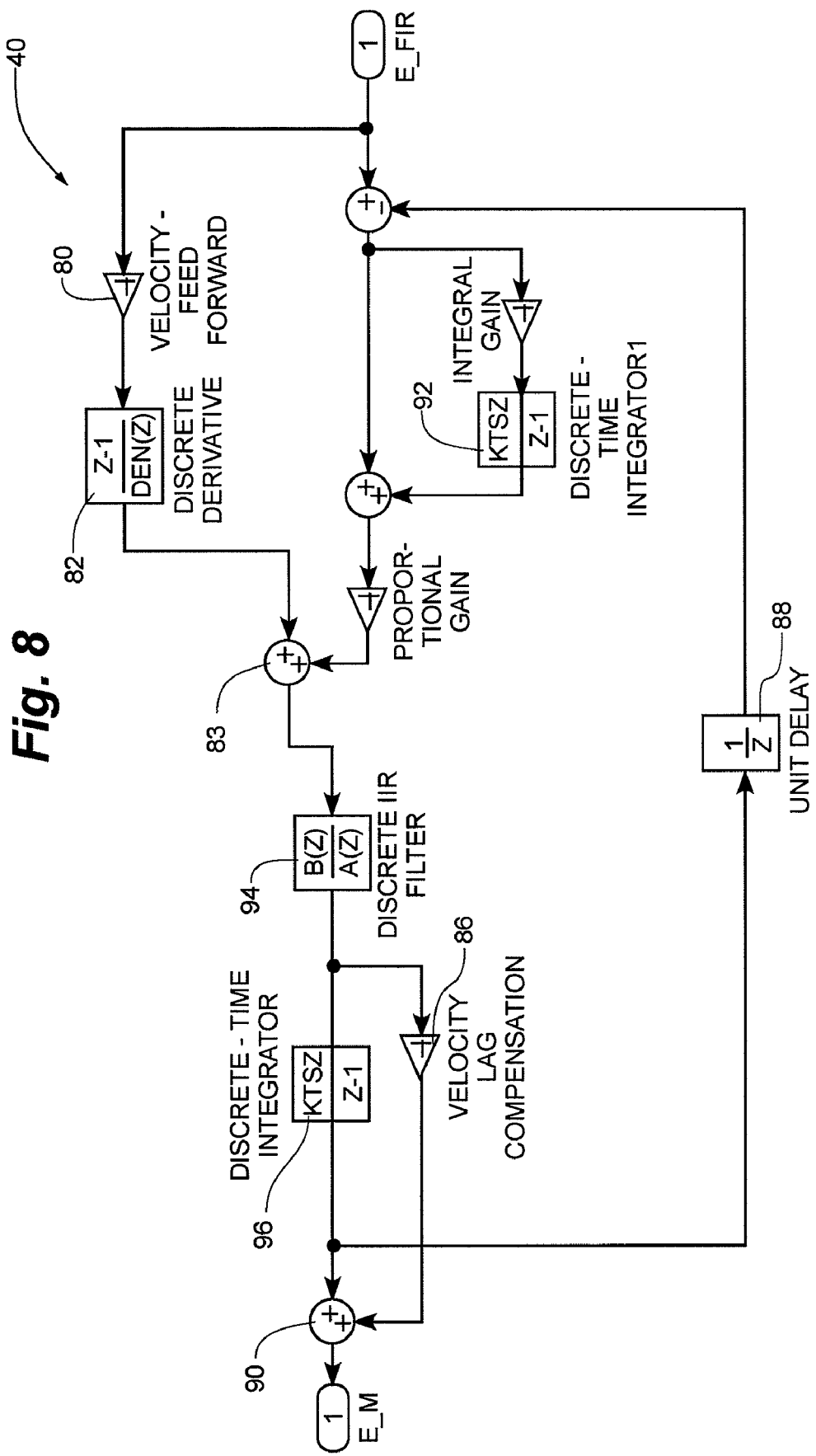
FIG. 8 is a block diagram of the position and speed interpolator block of the software-based R/D converter.

FIG. 8 is a block diagram of the position and speed interpolator block 40 of the software resolver to digital converter 16. The position and speed interpolator 40 is essentially a double integrating PI loop that performs the following functions:

(1) Improves the accuracy and resolution of the position theta. By adjusting the bandwidth of this loop, resolution can be traded off similar to a hardware RDC. As a rule of thumb, resolution can be improved by 0.5 bits every time the bandwidth is halved.

(2) Calculate angular velocity.

(3) Compensate for the group delay due to the FIR filter. Since this delay is constant and quantifiable, this can theoretically be compensated by setting the feedback delay of the PI loop equal to the group delay of the FIR filter.

Even after re-tuning the position interpolator control loop 40 such that the position error is driven to zero, there is still a velocity lag between the input and the output. This is because the algorithm is designed only to take out lag due to the FIR filter 26 and 28. Since the position error is being driven to zero, it is in fact accomplishing this task. However, there is still roughly 60-70 microseconds of lag between the input shaft position and the theta output of the model at 4320 RPM. There are still delays that remain due to hardware components in the system that contribute to additional lag. The analog-to-digital converter for example, contributes 20.26 microseconds of delay. In addition, there is lag due to the anti-aliasing filter.

Figure 10:
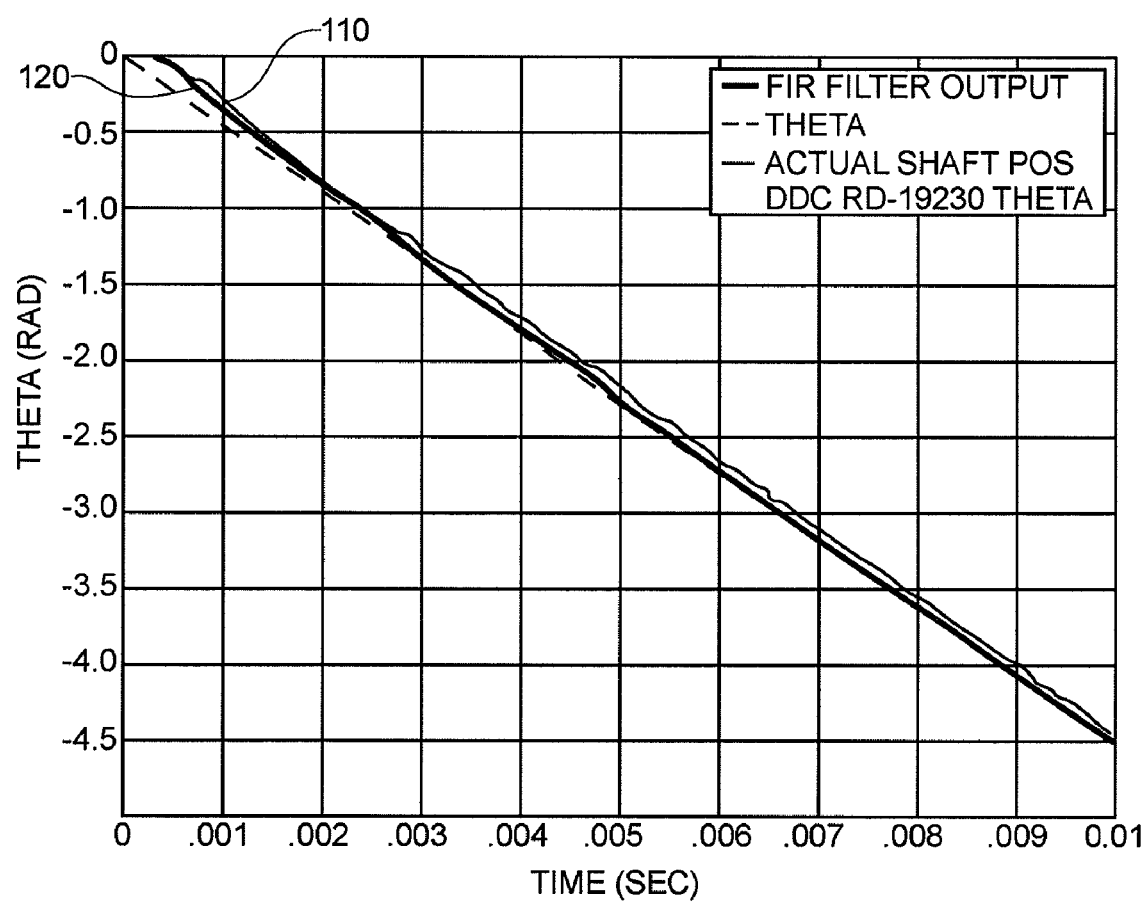
FIG. 10 is a graph comparing arctangent and interpolator versus shaft position with velocity feed-forward correction.

The effects just described are measurable and can be compensated for. The first effect is the large overshoots that persist for a long time before dying out. The overshoots are the result of the large integrator gains needed in the position interpolator to take out the lag due to the FIR filter. The use of velocity feed-forward can often mitigate this problem if used carefully. Position and speed interpolator control loop 40 takes the arctangent output signal and first directs it to a velocity feed-forward step 80 after which the discrete derivative 82 is calculated. By "priming the pump" with some velocity up front, the faster response results in smaller overshoots and faster settling behavior, as illustrated in FIG. 10, where actual shaft position is shown by line 110 and the FIR Filter output with velocity feed forward is 120.

Figure 9:
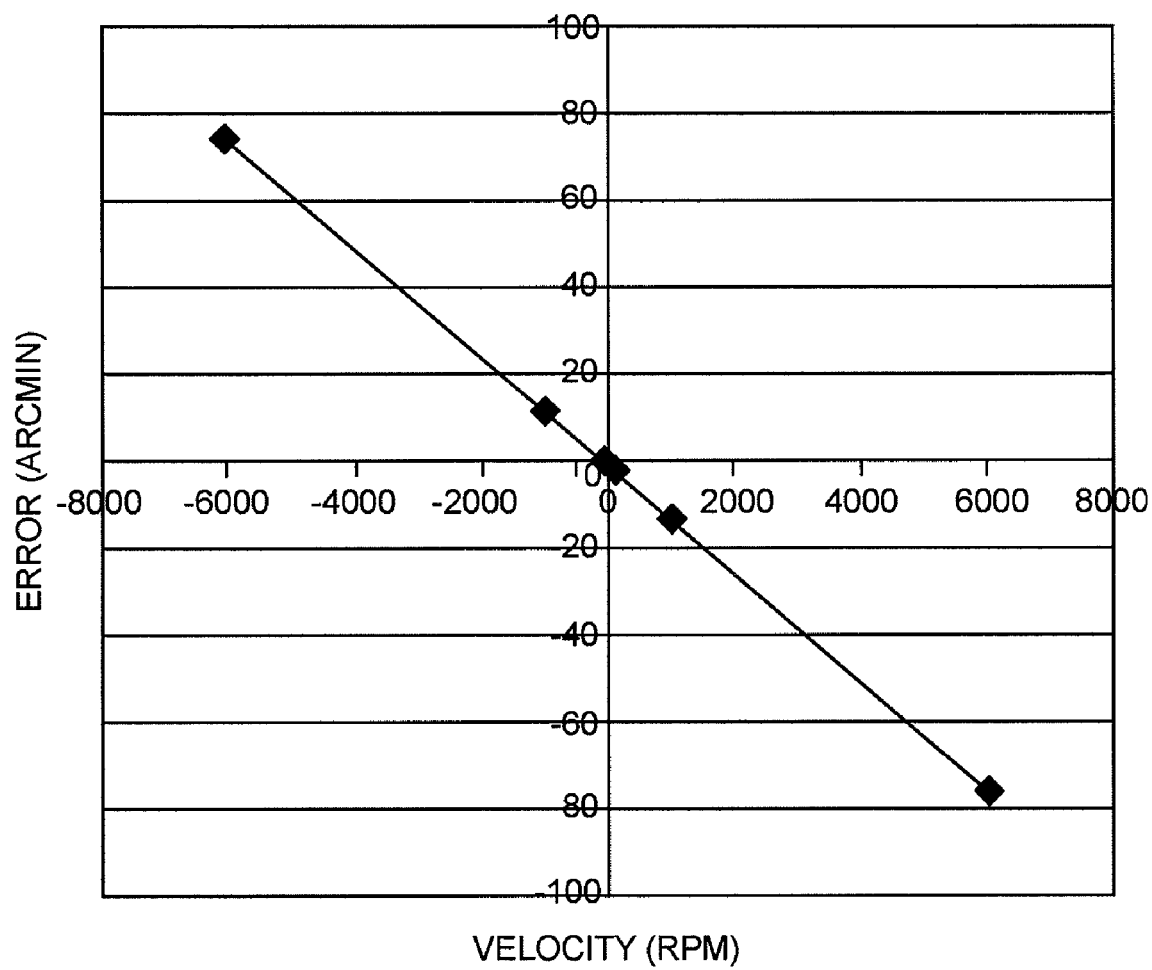
FIG. 9 is a graph of error in arcmin versus motor velocity.

The second effect is the residual velocity lag. The residual velocity lag due to system components can be canceled out by a velocity correction offset 86. Since the error has been found to be linearly increasing and decreasing, as illustrated in FIG. 9, it is rather trivial to cancel this error out. The gains are set depending on the slope of the error. The output signal of position and speed interpolator control loop 40 is compared at block 90 to the input signal after applying delay 88 that is the equivalent of the FIR filters group delay.

Position and speed interpolator control loop 40 includes first integrator 92 that smoothes the rotor angle signal and then adds the velocity feed forward term 83. The filtered position term is then differentiated by the discrete IIR filter 94 to produce an interpolated velocity signal. The second integrator 96 integrates the velocity signal to produce an interpolated position and also incorporates the velocity lag compensation term 86.

Furthermore, there are essential numerical effects that have been taken into account. In this implementation, the software is designed to run on a floating-point processor. It was found that using single-precision floating-point implementation in software was numerically unstable after the motor shaft would rotate for long periods of time. This was due to the integrators winding up with error due to the loss of precision after the number of motor turns gets larger. The solution was to implement the algorithm in software using double-precision floats. This forced the integrator to be minimized to a point where it is no longer an issue.

The resulting output from the interpolator is an enhanced resolution position signal that has the velocity lag due to the FIR filter removed. Note, however, that this algorithm does not compensate for delays due to other parts of the system (e.g., reference signal phasing, A/D converters, etc). Fortunately, these effects just described are measurable and can be compensated for. The residual velocity lag due to system components can be canceled out by a velocity correction offset. The gains of which can be set depending on the slope of the error.

Figure 11:
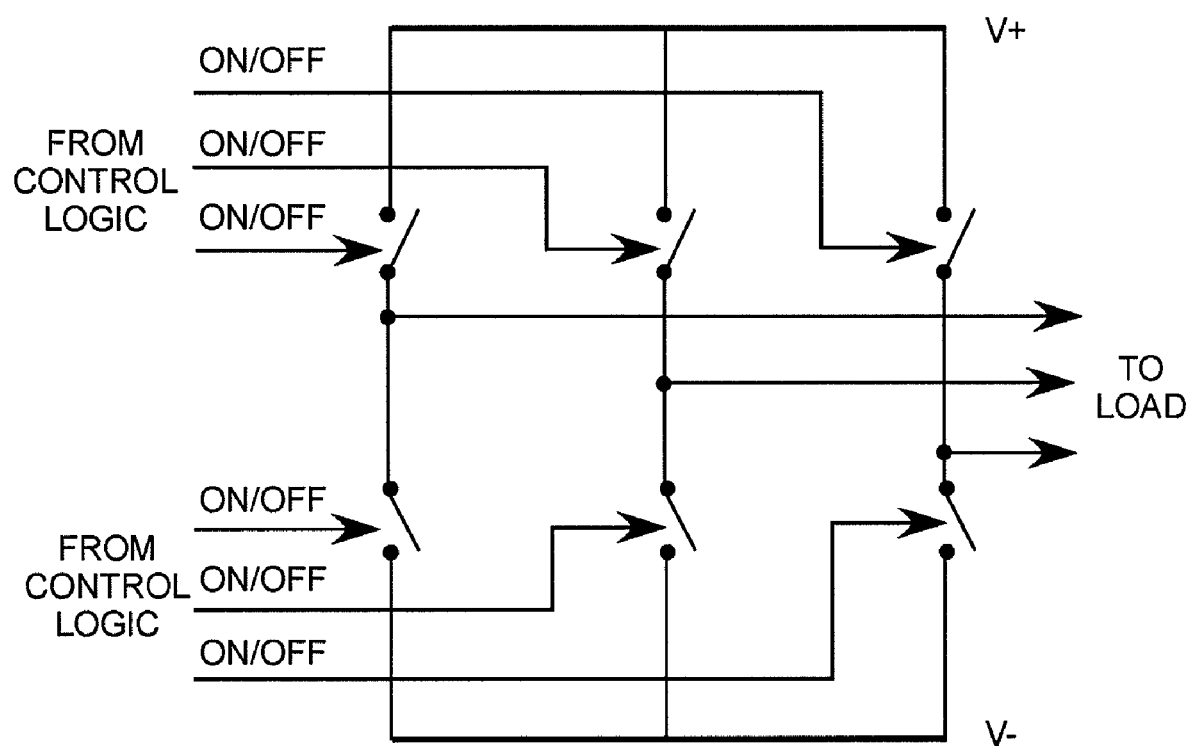
FIG. 11 is a prior art diagram of the switching system.

Another issue that arises with regard to motor control is the time lost due to operation of the inverter. In FIG. 11, the standard relationship is represented for three-phase control. Each of the three vertical sections containing an upper and lower switch is referred to as a "leg". Normally, when one switch opens, the other switch in the same leg closes. Since the transition between open and closed states takes a finite period of time, a delay is inserted between the opening of one switch and the closing of the other. This delay, called deadtime, prevents both the upper and lower switches from being on at the same time and acting as a short circuit across the DC power source. Typically, the deadtime is derived from the switch data sheets and a safety margin is added to account for changes across temperature ranges, aging of the switches and various operating conditions. Any nonzero deadtime injects a disturbance in the control output of the current control loop. This has an adverse effect on current control performance and robustness. This effect manifests itself in the form of distortion in the zero-crossing region of the motor phase current waveforms.

Figure 12:
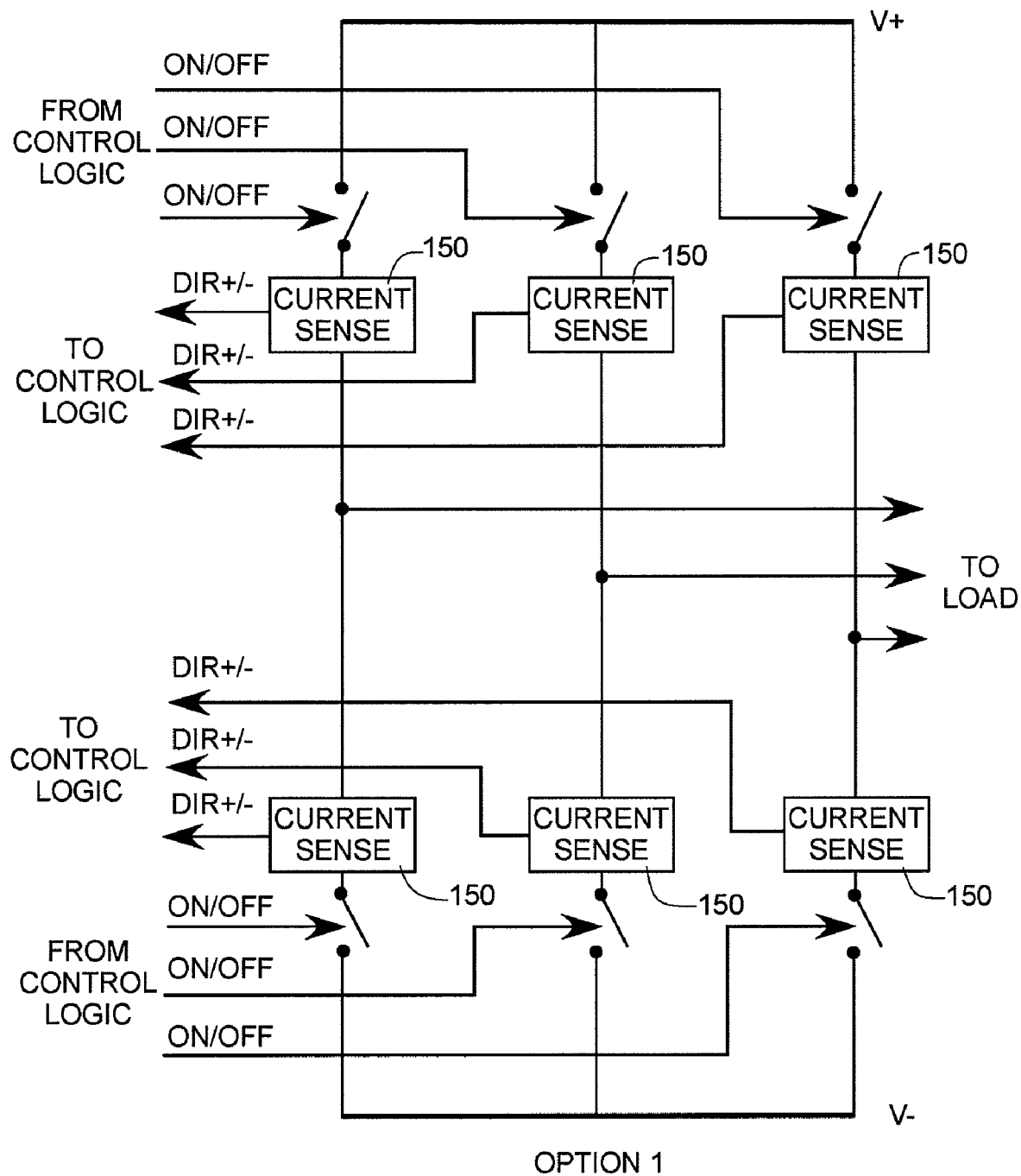
FIG. 12 is a diagram of the active compensation system for deadtime correction.

A novel method of compensating for this distortion is to monitor the on/off times of the switches in real time as illustrated in FIG. 12. This is accomplished by placing current monitors 150 next to each switch. The current monitors 150 could be either analog based (representing both the magnitude and direction of current flow) or digital based (representing the direction of current). The time between a commanded switch state and when the switch state was actually achieved would then be used as the deadtime. The advantage is that no margins of safety that negatively impact performance would have to be factored in. This information may also be used to determine whether a switch was in danger of imminent failure (if a correlation was found between increasing/decreasing deadtime and switch life).

Figure 13:
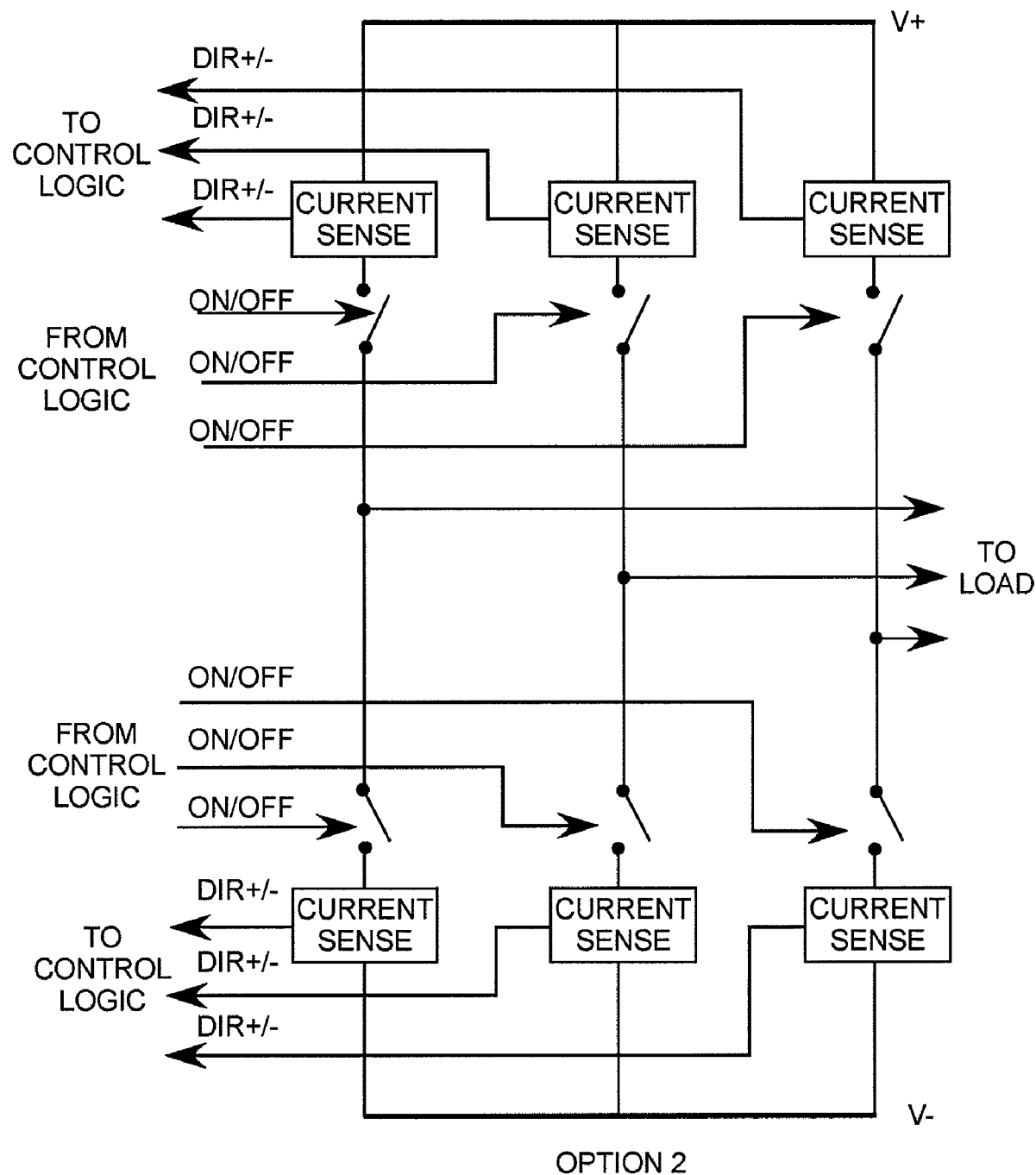
FIG. 13 is a diagram for an alternate active compensation system for deadtime correction.

The positioning of the current sensors 150 need not necessarily be on the load side of the switches as illustrated in FIG. 12. Rather, one may position the current sensors 150 on the power supply side of the sensors, as shown in FIG. 13. This alternative sensor placement may provide certain advantages, including the relative isolation of the current sensor from any inductive loading that may exist due to the motor. Further, assuming that the switch is an active switch with a reverse protection diode, when the switch is turned off, the current sensor would only be subjected to the leakage current that manages to pass through the switch's reverse protection diode.

The advantages of the present invention are numerous. A motor is controlled precisely and accurately by oversampling resolver outputs to enhance resolution of the computed position; utilizing a software based filtering system to improve bandwidth and accuracy; decimation of the sine and cosine signals by K to double the datapoints for the arctangent calculation; and compensating for deadtime of the switching through current sensors.

Although the invention has been described relative to the specific embodiment there are numerous variations and modifications that will be readily apparent to those skilled in the art in light of the above teaching. It is therefore understood that, within the scope of the appended claims, the invention may be practiced other than specifically described.

The invention claimed is:

1. A method for calculating a position of a motor by the analog output signals of a resolver with at least two stator windings arranged in a perpendicular alignment to each other on a stator and at least one rotor winding arranged on a rotor which can turn in relation to the stator, the method comprising the following steps:

applying a sinusoidal excitation signal to the rotor winding;

deriving a sinusoidal and a cosine resolver signal depending on the angular position of the stator in relation to the rotor form the stator windings;

converting the sinusoidal and cosine resolver signals into a sine and cosine digital signal, wherein converting utilizes any two analog to digital conversion inputs capable of simultaneously sampling the sine and cosine resolver signals at least 8 times per cycle;

filtering the sine and cosine digital signals through a FIR bandpass filter for bandwidth limiting;

decimating the oversampled, filtered sine and cosine digital signal down to the baseband, said decimation by a factor K so as to create a decimated sine and cosine signal;

rectifying the decimated sine and cosine signals;

normalizing the decimated sine and cosine signals;

correcting the quadrature of the decimating sine and cosine signals;

computing an arctangent output signal to derive an angular value for the relative angular position between the rotor and the stator;

converting the arctangent output signal to a position signal, said converting including adding a velocity feed-forward factor to remove lag due to the FIR filter and a velocity lag factor to remove residual velocity lag due to system components, the converting including the steps of:

smoothing the arctangent output signal by inputting into a first integrator, adding the velocity feed forward factor, differentiating the arctangent output signal by a discrete IIR filter to produce an interpolated velocity signal;

integrating the interpolated velocity signal by a second integrator to produce an interpolated positions signal;

adding the velocity lag compensation factor to the interpolated position signal to produce a motor position; and inputting a theta position for incorporation into a torque command to the motor.

2. The method of claim 1 wherein the signal processing procedure is performed by a signal processor.

3. The method of claim 2 wherein the signal processor is designed to run on a double-precision floating point processor.

4. The method of claim 1 wherein the steps related to providing a motor torque command include:

positioning a current sensor along each leg of a three phase system;

measuring the real on and off time of the switch;

calculating the deadtime between a switch command and the actual on and off time; and operating the switch without having to incorporate a margin of error delay time.

5. An apparatus for measuring the angular position of a shaft of a motor comprising:

a resolver having a rotor, the resolver having a first output representative of the sine of the rotor angle and a second output representative of the cosine of the rotor angle;

a software based resolver-to-digital converter having a first input operably connected to the first output representative of the sine of the rotor angle and a second input operably connected to the second output representative of the cosine of the rotor angle;

said software-based resolver-to-digital converter including a processor for converting the sine of the resolver rotor angle and the cosine of the resolver rotor angle to produce a shaft velocity and a shaft angle, said processor including a routine for decimating a resolver signal by a factor K, correcting for velocity lag and incorporating a velocity feed-forward term.

* * * * *